United States Patent Office 2,776,538
Patented Jan. 8, 1957

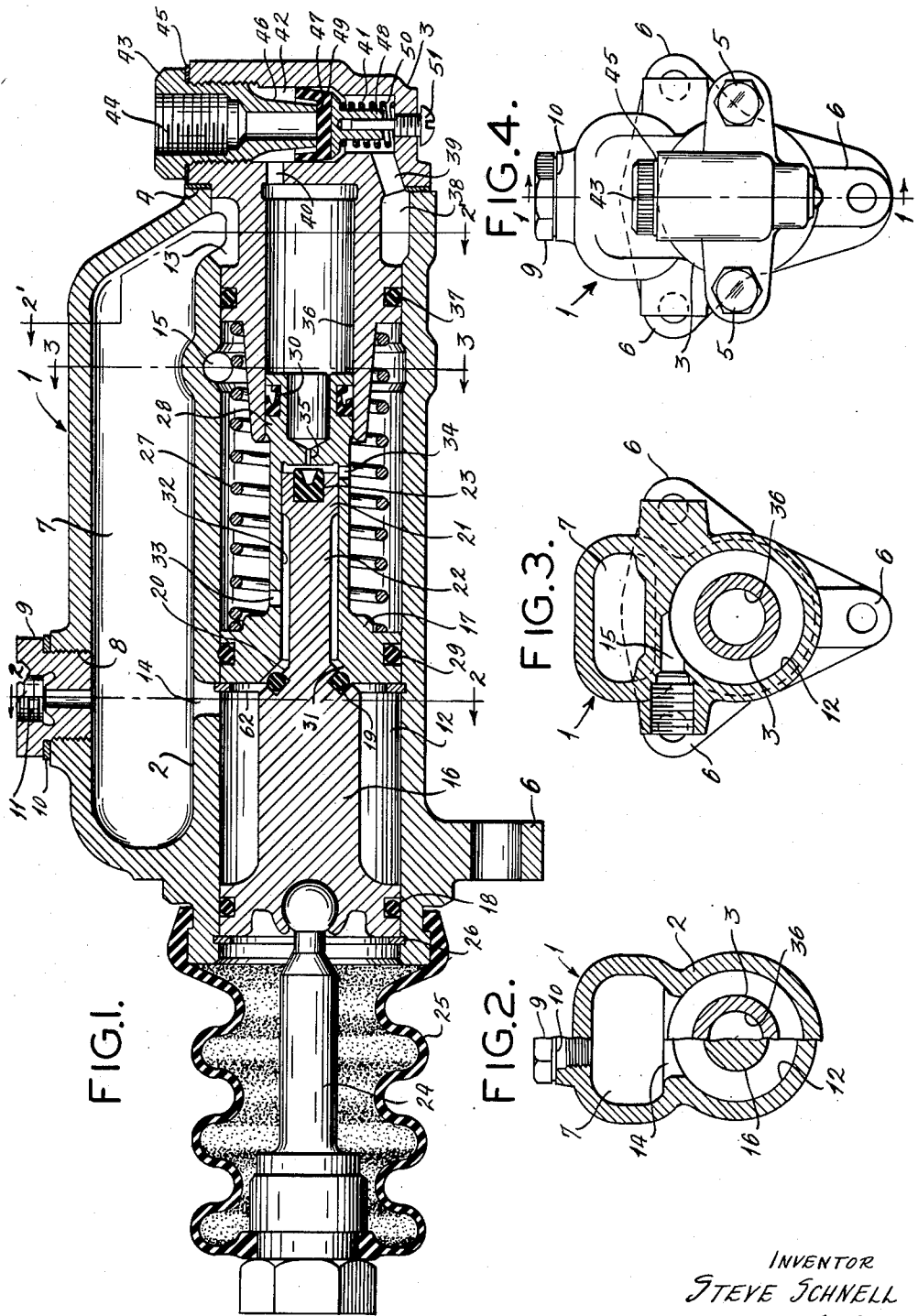

2,776,538

INJECTOR ASSEMBLY AND MASTER CYLINDER FOR POWER BRAKE SYSTEM

Steve Schnell, Kirkwood, Mo., assignor to Wagner Electric Corporation, St. Louis, Mo., a corporation of Delaware Application December 20, 1952, Serial No. 327,071

3 Claims. (Cl. 60—54.6)

This invention relates to power operated braking systems and more particularly to a combination of injector assembly and master cylinder and brake systems particularly suitable for use on heavy vehicles and which is easily operated, manufactured and installed.

One of the objects of the invention is to provide a braking system for heavy vehicles that requires minimum effort on the part of the driver, will produce maximum braking effort by the brake assembly and that is easily serviced, installed and manufactured.

Another object of this invention is to provide a master cylinder capable of metering a desired amount of pressure fluid to an injector assembly while simultaneously developing the desired braking pressure in the conduit leading to the brake assemblies.

Another object of this invention is to provide a master cylinder of the nature described above which will permit the operator to pump the foot pedal without appreciably decreasing the fluid pressure in the connecting conduit and fluid motors at the particular instant.

Another object of this invention is to provide a master cylinder for use as indicated above which is greatly simplified and sturdy in construction making it readily adaptable to any truck type vehicle using the specified power braking system thereon.

Still another object of this invention is to provide a device usuable in a power braking system and the like which is easily adaptable to said system by reason of its mode of operation, compactness and sturdy construction.

The invention is useful in a braking system wherein a smaller displacement piston in the master cylinder controls the pressure actuating the series of brake assemblies and wherein a known type of injector assembly displaces fluid derived from the master cylinder into the braking system counteracting the otherwise decreased fluid displacement when using a smaller displacement piston with a given piston travel thereby providing increased actuating pressures without requiring additional pedal effort on the part of the driver or operator.

The invention consists in the provision of a master cylinder of the double piston type wherein one piston forces liquid into an injector assembly and the other forces fluid into brake assemblies, the fluid displaced by the first piston being added to the fluid displaced by the other piston, and wherein the displacement space of the other piston is compensated past a valve located at the discharge end thereof from liquid in the master cylinder reservoir.

In the drawings:

Fig. 1 is a vertical longitudinal cross-sectional view of a master cylinder embodying the invention, taken substantially along the line 1—1 of Fig. 4.

Fig. 2 is a sectional view taken along the lines 2—2 and 2'—2' of Fig. 1 combined into a single view, Fig. 3 is a sectional view taken along the line 3—3 of Fig. 1, and Fig. 4 is an end view of the master cylinder looking toward the left in Fig. 1.

Before describing the selected embodiment to illustrate the invention, it should be understood that the terms "fluid pressure" and "pressure fluid" are common in this art and refer respectively to the pressure exerted by the fluid, and the fluid itself irrespective of pressure.

Referring now to Figs. 1 to 4 of the drawings the master cylinder assembly 1 is shown comprised of a primary cylinder 2 and a secondary cylinder 3, the cylinders being clamped together by cap screws 5 (Fig. 4) there being a seal 4 (Fig. 1) interposed between the two cylinders. The primary cylinder 2 is provided with a reservoir 7 near its top, the reservoir being provided with an opening 8 for receiving a filler cap 9 sealed thereto by reason of sealing member 10. The filler cap 9 is provided with an inlet or bore 11 to which a conduit is secured to be described later. Directly below the reservoir 7 (Fig. 1) is the cylinder 2 having a cylindrical bore 12 therein connected with the reservoir by fluid port 13 and supply port 14. The bore 12 has an outlet 15 therein (Figs. 1 and 3) to which a suitable conduit is attached also to be described later.

Slidably mounted in the bore 12 (Fig. 1) is a secondary piston 16 and a primary piston 17. The secondary piston 16 supports an O ring 18 at its left end to prevent the passage of liquid between the piston head and cylinder wall and its subsequent loss and also an O ring 19 fitted in a groove of face 20 on the piston 16 for creating a seal between the face 20 and a corresponding face 31 on the primary piston 17. Piston 16 has an extension 21 thereon which is provided with a seal 23 in the right end thereof for closing the small port 35 in the primary piston 17 during certain stages of operation. The extension 21 is provided with a reduced portion 22 to permit the flow of pressure fluid thereabout when the O ring 19 is removed from the face 31 of the piston 17. The secondary piston 16 is limited in its leftward movement by a snap ring 26. A push rod 24 is suitably connected to the left end of the piston 16 for transmitting the force from the brake pedal (not shown), controlled by the operator, to the piston 16. The push rod 24 also supports the left hand end of boot 25 and has its right hand end surrounding the open end of cylinder bore 12 in the primary cylinder 2, the purpose of the boot being to prevent the ingress of dirt and other foreign material into the bore 12 of the primary cylinder 2.

The primary piston 17 is provided with a small bore 32 for receiving the extension 21 of the secondary piston 16 and is also provided with a passage 33 for permitting the pressure fluid that is allowed to flow past the faces 20 and 31 of the secondary piston 16 and primary piston 17 respectively to flow about the reduced portion 22 of the piston 16 and thence through the passage 33 into that portion of the bore 12 external of the bore 32 in said piston 17. The primary piston 17 is limited in its leftward movement by snap ring 62 and has an extension 28 which is slidably received in bore 36 of the secondary cylinder 3. A cup 30 carried on the right hand end of the extension 28 of the piston 17 prevents the passage of pressure fluid between the outer cylindrical surface of the extension 28 and the wall of bore 36. The previously mentioned port 35 concentric with the axis of the bore 36 aided by vertical passage 34 permits the fluid which surrounds the extension 28 in the cylindrical bore 12 to pass into the small bore 32 and thence into bore 36 of the secondary cylinder 3. The port 35 and passage 34 is closed off by the extension 21 of the secondary piston 16 during certain stages of operation. The piston 17 is normally biased to the left by return spring 27 which abuts the piston 17 at its left hand end and is supported by the secondary cylinder 3 at its right hand end. The primary cylinder 2 also has brackets 6 for mounting the master cylinder assembly 1 to the vehicle.

The secondary cylinder 3 is received in the right end of bore 12 of the primary cylinder 2 and, in turn receives the extension 29 of the primary piston 17. The cylinder 3 carries an O ring 37 to prevent the passage of pressure fluid between the wall of bore 12 and the inserted portion of the secondary cylinder 3. The cylinder 3 also has a bore 41 and a counterbore 42 that houses valve 48. The upper end of counterbore 42 receives an outlet plug 43 having an extension 46 thereon constituting a seat 47 for the valve 48 and supported valve cup 49. The valve 48 is normally biased upward by valve spring 50 to hold the valve cup 49 against the seat 47. A valve guide 51 is fitted into the lower portion of bore 41 and serves to maintain the valve 48 in proper alignment with the seat 47 on the outlet plug 43. The outlet plug 43 is sealed to the secondary cylinder 3 by sealing member 45 and is provided with an outlet passage 44 to which is connected a suitable conduit to be described later. A passage 40 (Fig. 1) is provided in the secondary cylinder 3 to connect the bore 36 therein with counterbore 42 and a lower passage 39 is provided to connect the groove 38 in the secondary cylinder 3 with the bore 41 thus providing a means of obtaining fluid from the reservoir 7 through the fluid port 13 passing around the annular groove 38 to passage 39 and then into the bore 41.

When the operator of the vehicle wishes to brake the vehicle which has the above braking system installed thereon a force is transmitted to the push rod 24 of the master cylinder 1 through a conventional brake pedal and linkage arrangement (not shown). Thus a rightward movement of the push rod 24 will cause a similar motion to be imparted to the secondary piston 16, (Fig. 1) whereupon the O ring 19 will provide a seal between the faces 20 and 31 on the secondary piston 16 and primary piston 17 respectively while simultaneously the seal 23 carried by the extension 21 of the piston 16 will close the passage 34 and port 35 in the primary piston 17 to close the previously mentioned passages. A rightward movement is then imparted to the primary piston 17 to bring about a simultaneous action in both pistons. The fluid in bore 12 surrounding the extension 28 of the primary piston 17 is forced through outlet 15 by the primary piston 17.

As fluid is forced through outlet 15 of the master cylinder 1, the extension 28 (Fig. 1) of the primary piston 17 begins to force pressure fluid in the bore 36 of the secondary cylinder 3 through the passage 40 into counterbore 42 to force the valve 48 and adjacent cup 49 downward by overcoming the force of spring 50 to remove the said valve cup 49 from its seat 47 on the outlet plug 43. Thus pressure fluid entering counterbore 42 from passage 40 is permitted to flow upward through the outlet port 44 in the outlet plug 43. The fluid pressure present in the braking system is dependent upon the force applied to the extension 28 of the primary piston 17 (Fig. 1) by the operator who applies the necessary operating force through the previously described brake pedal and linkage (not shown), the connecting push rod 24 and secondary piston 16. The same volume of fluid supplied to the injector assembly by the primary piston 17 is delivered into the brake system regardless of the resulting pressure. In other words, the primary purpose of the injector assembly is to compensate for the decrease in fluid displacement when the effective size of the master cylinder piston is decreased, such as the right hand end of the extension 28 (Fig. 1) of the primary piston 17, provided that a given piston travel or pedal travel is maintained. It would be possible in the present instance to eliminate the injector assembly and maintain the smaller effective piston such as the extension 28 provided the travel of the piston could be increased sufficiently to obtain the necessary fluid displacement. The use of the smaller effective piston decreases the required amount of pedal effort required on the part of the operator to obtain a given braking torque of the brake assemblies; however, the increased travel would make the use of a smaller piston impractical. Thus, to eliminate the necessity of the increased piston travel or pedal travel the injector assembly is used with the subject master cylinder to compensate for the otherwise increased piston travel which is dependent upon the required fluid displacement.

It should be noted that the operator can decrease the braking pressure in the conduits connecting the fluid motors by permitting a partial return of the primary piston 17. The decrease can be sufficient to allow the vehicle to continue its forward movement and then the original braking pressure can be restored with less pedal effort than was originally required. However, if the pistons 16 and 17 return sufficiently to break contact between faces 20 and 31 on the pistons the operator must then exert a greater pedal effort than would be required if the contact were not broken. Actually, when the partial return of piston 17 is permitted the leftward movement of the extension 28 decreases the pressure in bore 36, while the larger portion of piston 17 is creating a vacuum in the portion of bore 12 external of extension 28. The return flow of pressure fluid through outlet 15 is prohibited by certain known valving in the injector assembly related therewith. Thus when the operator wishes to restore the original fluid pressure the only resistance to the rightward movement of piston 17 (Fig. 1) is the fluid in bore 36 since a vacuum exists in bore 12 external of extension 28. Therefore, with less resistance acting on piston 17 there is naturally less pedal effort required on the part of the operator.

In the event the operator wishes to obtain additional fluid from the reservoir 7 (Fig. 1) during a braking application the force applied to push rod 24 is suddenly decreased to allow the primary piston 17 to be returned to its original position by action of the return spring 27 and by the force created by the pressure acting on the right hand end of the extension 28 of the primary piston 17. The secondary piston 16 will be returned to its original position which will cause the contact between the faces 20 and 31 to be broken permitting a flow of pressure fluid from the reservoir 7 to pass through the connecting supply port 14 past the previously described faces into the bore 32 of the primary piston 17 and thence through passage 33 into that portion of bore 12 external of the extension 28. The small port 35 in the primary piston 17 prevents a sudden drop of the pressure to the right of the said piston 17 in bore 36 and the connecting conduits leading to the brake assemblies allowing the operator to obtain additional fluid and its transferral to the injector assembly before the pressure in the operating lines has been appreciably decreased. The force is then restored to the push rod 24 and connecting piston 16 which will cause the piston 16 to impart a rightward movement on the piston 17 after the previously described passages have been closed to prevent the escape of pressure fluid from the pressure side of the primary piston 17. However, the resulting pressure is still dependent upon the force applied to the extension 28 of the primary piston 17 (Fig. 1) by the operator. It should also be noted that the valve cup 49 will be removed from seat 47 on the outlet plug 43 at all times when the pressure fluid acting thereon is above the predetermined pressure as determined by the strength of valve spring 50. Normally, a very light pressure is retained in the connecting conduits by reason of spring 50 and valve 48 to maintain fluid throughout the system preventing a possible entrance of air. Furthermore, in the event that the quick return of the primary piston 17 to its original position creates a vacuum in the bore 36 and counterbore 42 of the secondary cylinder 3, the cup 49 will be collapsed to permit pressure fluid to pass from reservoir 7 through the fluid port 13 around the groove 38 and thence through passage 39 into bore 41 flowing upward to counterbore 42 and through passage 40 into the bore 36. Then the returning fluid after it has had sufficient time to flow from the fluid motors back to the master cylinder 1 can displace the fluid that was brought in from the reservoir 7 during the quick return movement of the primary piston 17 by forcing the fluid through the port 35 and passage 34 to the portion of bore 12 surrounding the extension 28 and thence through passage 33 and outward between the faces 20 and 31 on the secondary piston 16 and primary piston 17 respectively to the left side of the primary piston 17 and upward through the supply port 14 to the reservoir 7.

In the event the injector assembly becomes inoperative during a braking application the master cylinder 1 will function essentially as a standard type master cylinder with the effective piston area being equivalent to the area on the left end of the primary piston 17 or left end of the secondary piston 16. However, after a predetermined pressure has been obtained the force applied to the piston 17 may be temporarily relieved to decrease the braking pressure sufficiently to allow the vehicle to continue its forward movement and the pressure can then be restored with a lesser effort since the pressure decrease is brought about by the leftward movement of extension 28 of the primary piston 17. This procedure is possible since the fluid forced through the outlet 15 is not permitted to return therethrough by reason of the valving in the injector assembly and, consequently, cannot assist the pressure in bore 36 of the secondary cylinder 3 to force the piston 17 leftwardly as the operator decreases his pedal pressure. However, this advantage will not prevail if the operator releases the pedal sufficiently to permit additional pressure fluid to flow from the master cylinder reservoir 7 to the portion of bore 12 external of extension 28 which would assist the fluid in bore 36 to offer a resistance to the rightward movement of piston 17.

The subject master cylinder also permits the operator to add additional fluid to the pressure side of the system by "pumping" the pedal even if the related injector assembly becomes inoperative.

What is claimed is:

1. A pressure producer for automotive vehicles comprising a master cylinder, means fitted into said cylinder having a cylinder bore therein of lesser diameter than the master cylinder, means forming a reservoir for said master cylinder, a piston having two heads of different diameters in which one head slides in the master cylinder and the other head slides in the smaller bore cylinder, a compensating valve for controlling the discharge from said small bore cylinder, means for establishing communication between said reservoir and the small bore cylinder past said valve, means for establishing communication between said reservoir and the space ahead of each piston head and in their respective cylinders through said piston, actuating means for said piston; and a valve controlled by said actuating means for controlling the flow of fluid in said last mentioned communication means.

2. A pressure producing device comprising a first cylinder, a fluid reservoir for said cylinder, a second cylinder extending into one end of said first cylinder and having a bore therein that is smaller than the bore in said first cylinder, a piston having two heads thereon one head slidable in said first cylinder and the other slidable in said second cylinder, a valve for the discharge end of said second cylinder, means for establishing communication between said reservoir and said second cylinder which includes said valve, means for establishing communication between said reservoir and the space in each of said cylinders ahead of the piston therein, valve means for controlling the flow of fluid into each space; and means for actuating said valves and said piston to force fluid from the space ahead of each piston head.

3. A pressure producing device comprising a first cylinder, a fluid reservoir for said cylinder, a second cylinder inserted in one end of said first cylinder and constituting a closure therefor, a piston having two heads thereon, one head disposed in each cylinder, means for establishing communication between said reservoir and said second cylinder through the discharge end thereof, a valve in said means permitting flow of fluid from said reservoir and preventing a return flow thereto, means for establishing commucation between said reservoir and the space ahead of each piston head in each of said cylinders, a discharge port for the space ahead of said large piston head, actuating means for advancing said pistons in each of said cylinders, valves on said last mentioned means for controlling the flow of fluid in said last mentioned communication means, being closed when the actuating means advances said piston; and a spring for reversely moving said piston.

References Cited in the file of this patent
UNITED STATES PATENTS

| | | |
|---|---|---|
| 1,173,703 | Benkert | Feb. 29, 1916 |
| 1,748,531 | Troup | Feb. 25, 1930 |
| 2,298,848 | Swift | Oct. 13, 1942 |
| 2,322,009 | Fowler | June 15, 1943 |
| 2,328,683 | Schnell | Sept. 7, 1943 |
| 2,349,310 | Schnell | May 23, 1944 |
| 2,382,263 | Schnell | Aug. 14, 1945 |
| 2,454,563 | Mercier | Nov. 23, 1948 |
| 2,525,979 | Vickers | Oct. 17, 1950 |
| 2,608,159 | Born | Aug. 26, 1952 |
| 2,636,349 | Schnell | Apr. 28, 1953 |
| 2,671,466 | Conrad | Mar. 9, 1954 |